United States Patent [19]

Condo' et al.

[11] Patent Number: 4,894,211

[45] Date of Patent: Jan. 16, 1990

[54] PROCESS FOR THE PRODUCTION OF GRANULAR SODIUM PERBORATE MONOHYDRATE HAVING GOOD MECHANICAL STRENGTH

[75] Inventors: Antonino Condo'; Renzo Ferrario, both of Milan, Italy

[73] Assignee: Ausimont S.p.A., Milan, Italy

[21] Appl. No.: 863,529

[22] Filed: May 15, 1986

[30] Foreign Application Priority Data

May 16, 1985 [IT] Italy .................. 20744 A/85

[51] Int. Cl.$^4$ ............................................. C01B 15/12
[52] U.S. Cl. ................... 423/266; 252/186.3; 252/385; 423/267; 423/274; 423/275; 423/277; 423/279; 423/280; 423/281
[58] Field of Search .............. 252/186.3, 385; 423/275, 279, 266, 267, 274, 277, 280, 281

[56] References Cited

U.S. PATENT DOCUMENTS

| | | | |
|---|---|---|---|
| 2,155,704 | 4/1939 | Watson et al. | 423/279 |
| 2,937,998 | 5/1960 | Habernickel | 252/186.3 |
| 2,979,464 | 4/1961 | Pistor | 252/186.3 |
| 3,154,496 | 10/1964 | Suerre | 252/186.3 |
| 3,311,446 | 3/1967 | Kegelart | 423/275 |
| 3,533,738 | 10/1970 | Rundell et al. | 423/330 |
| 3,640,885 | 2/1972 | Rhees | 252/186.31 |
| 4,002,434 | 1/1977 | Simmersbach et al. | 423/281 |
| 4,115,519 | 9/1978 | Brichard et al. | 423/279 |
| 4,117,087 | 9/1977 | Dillenburg et al. | 423/275 |
| 4,215,097 | 7/1980 | Brichard et al. | 423/279 |
| 4,391,727 | 7/1983 | Benz | 252/186.3 |
| 4,539,131 | 9/1985 | Garner-Gray | 252/186.3 |

FOREIGN PATENT DOCUMENTS

| | | | |
|---|---|---|---|
| 45804 | 4/1958 | Canada | 252/186.3 |

OTHER PUBLICATIONS

Julius Grant editor, *Hackh's Chemical Dictionary*, 3rd edition, McGraw-Hill Book Company, Inc. New York, 1944, p. 771.

*Primary Examiner*—John Doll
*Assistant Examiner*—Jeffrey Edwin Russel
*Attorney, Agent, or Firm*—Stevens, Davis, Miller & Mosher

[57] ABSTRACT

The invention relates to a process for the production of granular sodium perborate monohydrate having good mechanical strength. The process is characterized in that sodium silicate having an $SiO_2/Na_2O$ molar ratio comprised within the range of from 0.4 to 2.0 is added to granular sodium perborate tetrahydrate while this is being kept in movement and the so processed perborate tetrahydrate is dried until perborate monohydrate is obtained.

9 Claims, No Drawings

PROCESS FOR THE PRODUCTION OF GRANULAR SODIUM PERBORATE MONOHYDRATE HAVING GOOD MECHANICAL STRENGTH

BACKGROUND OF THE INVENTION

1. Field of the Invention

The present invention relates to a process for the production of granular sodium perborate monohydrate having good mechanical strength.

2. Description of the Prior Art

Granular sodium perborate monohydrate $NaBO_2 \cdot H_2O_2$ is obtained by dehydrating the corresponding granular tetrahydrate $NaBO_2 \cdot H_2O_2 \cdot 3H_2O$.

Relative to the tetrahydrate, perborate monohydrate shows essentially three advantages: a higher titer in active oxyen, a higher heat stability and a greater solution rate.

It is however known that perborate monohydrate is considerably brittler than the tetrahydrate, and this is one of the main reasons which so far have limited its use.

Such a drawback is in fact particularly detrimental, because it leads, during the handling of the product, to a change of its granulometric distribution, with an increase in finer fractions. The fine product creates dust during its use, and hence causes problems of environmental hygiene.

Furthermore, while perborate tetrahydrate is usually moved in bulk, this cannot be realized with perborate monohydrate which would be easily crushed by the pneumatic conveying plants, utilized, at present, everywhere.

For the reason above stated, monohydrate is moved only in bags, with higher packaging costs and reduced storing capacity.

THE PRESENT INVENTION

An object of the present invention is to provide a process for the production of granular sodium perborate monohydrate having good mechanical strength and, therefore, movable in bulk.

This and still further objects are achieved by the process of the present invention for the production of granular sodium perborate monohydrate having good mechanical strength. This process is characterized in that sodium silicate having an $SiO_2/Na_2O$ molar ratio comprised within the range of from 0.4 to 2.0 is added to granular sodium perborate tetrahydrate while the sodium perborate tetrahydrate is being kept in motion.

The above mentioned addition can be carried out either by wetting granular sodium perborate tetrahydrate, while in motion, with an aqueous solution of sodium silicate or by thoroughly mixing sodium silicate, in solid state, with granular sodium perborate tetrahydrate.

The treated tetrahydrate is then conveniently dried so that perborate monohydrate is obtained.

The wetting phase, with aqueous solutions of sodium silicate, can be carred out through known methods such as spraying, dropping, nebulization, etc.

The amount of added sodium silicate, computated as the anhydrous salt (i.e., as the sum of $SiO_2$ and $Na_2O$) relative to sodium perborate tetrahydrate is generally comprised within the range of from 0.25 to 2.5% by weight. Preferably, an amount thereof of from 0.5 to 1.5% is used.

In the case that sodium silicate is added in aqueous solution form, the latter can have a concentration comprised, for example, between 5 and 50% by weight.

In the case that the mixing of the two salts is carried out in the solid state, it is preferable to add dry sodium silicate, in very fine granular state, to damp granular sodium perborate, so as a more perfect diffusion of the additive compound on the perborate crystals surface can be realized. As damp perborate, a product containing generally up to 10% by weight of water is referred to.

The wetting or mixing of perborate tetrahydrate with sodium silicate are usually carried out at room temperature. However, also operating at a temperature higher or lower than room temperature is possible, provided such operating temperature be lower than 63° C., which is the melting point of sodium perborate tetrahydrate.

The wetting or mixing are carried out on perborate tetrahydrate which is being kept in movement, for example, by a rotary drum. It is preferable that after the end of the addition the mass be further kept in movement, either in the same equipment wherein the spraying took place, or in another device, in order to secure a homogeneous distribution of the product added to the granules of perborate.

The drying of sodium perborate tetrahydrate processed according to the present invention is carried out according to the known modalities for the drying of perborate tetrahydrate to the monohydrate salt. It can be carried out under stationary conditions (with high-temperature air and/or under vacuum) or, in one or more steps, on the product kept in motion (e.g., on a fluid-bed dryer, on a vibrating-bed dryer, or in a rotary drum). The operation can be done, e.g., in a rotary vacuum dryer at temperatures comprised within the range of from 25° to 90° C.

As it has already been mentioned, the $SiO_2/Na_2O$ molar ratio of the sodium silicate is comprised within the range of from 0.4 to 2.0. Preferably, said ratio is comprised between 0.5 and 1.5. The molar ratio 1.0, which corresponds to a solution of sodium metasilicate, is particularly suitable.

In this case use can be made both of anhydrous sodium metasilicate and of hydrated sodium metasilicate in any hydration form.

The granules of perborate tetrahydrate can also be treated with an aqueous solution of $H_2O_2$ before being added with the sodium silicate. This pretreatment by $H_2O_2$ allows the slight decrease in active oxygen titer due to the addition of sodium silicate to perborate to be compensated for. The amount of added $H_2O_2$, calculated as anhydrous hydrogen peroxide, is usually comprised within the range of from 0.1 to 1% by weight, relatively to perborate tetrahydrate. The concentration of the $H_2O_2$ aqueous solution is comprised e.g. within the range of from 5 to 60% by weight. It is usually sprayed at room temperature; also operating at a temperature lower or higher than room temperature is possible, provided the operating temperature be lower than 63° C.

The use of sodium silicate, according to the present invention, yields further advantages besides that of decreasing the brittleness of sodium perborate monohydrate. First of all, it is perfectly water-soluble, so that the solubility of the perborate monohydrate granules is not decreased. On the other hand, sodium silicate is perfectly compatible with perborate monohydrate and with the other components used in the detergent formulations. A further advantage of sodium silicate is that it increases the stability of perborate in solution, thus increasing the time of active oxygen release; the time during which the perborate exerts its action during the washing process results hence increased.

The following examples are supplied to the purpose of better illustrating the inventive concept of the present invention.

EXAMPLE 1

A sample of 200 g of sodium perborate tetrahydrate having a titer in active oxygen of 10.00% is sprayed, at room temperature, in a stainless-steel rotary drum of 1 liter of capacity, with 10 g of an aqueous solution at 20% by weight of sodium silicate having an $SiO_2/Na_2O$ molar ratio equal to 1. The amount of solution is such as to correspond to the addition of 1.0% of sodium silicate as referred to perborate tetrahydrate. The mass is then kept in movement for one further hour to guarantee a complete homogenizing.

The additive-containing product is subsequently dehydrated in a rotary dryer by operating under a residual pressure of 15 $mm_{HG}$: the temperature is gradually increased from 25° to 90° C. within a 30 minutes time and is kept constant at 90° C. for a further 30 minutes.

The so-obtained perborate monohydrate is characterized by determining its titer in active oxygen, its brittleness, its bulk density, its solution rate and its stability in solution.

The brittleness is determined on the fraction of 0.4–0.8 mm of mesh opening by the test as of European Laboratory Standard Practice Instructions No. 7/17050 of June 10th, 1971. The higher the brittleness value, the more fragile the product.

The solution rate is measured by a conductometric method on 1.5 g of product screened between 0.4 and 0.8 mm of mesh opening, placed in 750 ml of water at 20° C. under stirring: when the conductivity of the solution remains constant, all the product has been dissolved.

The stability in solution is determined at 90° C. on a 1% solution of perborate monohydrate submitted to a two hours stirring: the residual active oxygen at the end of the test is measured.

The results of the characterization are the following:
  titer in active oxygen: 15.02%
  bulk density: 0.546 g/cc
  brittleness: 39.9%
  solution rate: lower than 1 minute
  stability in solution: 68.0%

EXAMPLE 2

An identical sample of perborate tetrahydrate is process as in Example 1, with the exception that, to comparison purpose, no addition has been carried out.

The data obtained from the analysis of the so obtained additive-free product are the following:
  titer in active oxygen: 15.27%
  bulk density: 0.514 g/cc
  brittleness: 77.4%
  solution rate: lower than 1 minute
  stability in solution: 50.4%

EXAMPLE 3

The test is carried out as in Example 1, with the exception that the specifically described modalities have been used.

The spraying is carried out with 9 g of aqueous solution at 11% by weight of sodium silicate having an $SiO_2/Na_2O$ ratio of 1. This corresponds to the addition of 0.5% by weight of sodium silicate as referred to perborate tetrahydrate.

The characteristics measured on the obtained perborate monohydrate are the following:
  titer in active oxygen: 15.03%
  bulk density: 0.547 g/cc
  brittleness: 35.6%
  solution rate: lower than 1 minute
  stability in solution: 65.3%

EXAMPLE 4

The test is carried out as in Example 1, with the exception that the specifically described modalities have been used.

The spraying is carried out with 10 g of aqueous solution at 25% by weight of sodium silicate having an $SiO_2/Na_2O$ molar ratio of 0.67. This corresponds to the addition of 1.3% by weight of sodium silicate as referred to perborate tetrahydrate.

The analytical data measured on the perborate monohydrate obtained are the following:
  titer in active oxygen: 15.13%
  bulk density: 0.547 g/cc
  brittlenes: 42.5%
  solution rate: lower than 1 minute
  stability in solution: 72.5%

EXAMPLE 5

The test is carried out as in Example 1, with the exception that the specifically described modalities have been used.

Two sequential sprayings are carried out. The first spraying is carried out with 5 g of aqueous solution at 8% by weight of $H_2O_2$, corresponding to the addition of 0.2% by weight of $H_2O_2$ as referred to perborate tetrahydrate. The second spraying is carried out with 5 g of solution at 32% by weight of sodium silicate having an $SiO_2/Na_2O$ molar ratio of 0.62, corresponding to the addition of 0.8% by weight of sodium silicate as referred to perborate tetrahydrate.

The analytical data measured on the obtained perborate monohydrate are the following:
  titer in active oxygen: 15.26%
  bulk density: 0.545 g/cc
  brittleness: 43.3%
  solution rate: lower than 1 minute
  stability in solution: 72.3%

EXAMPLE 6

The test is carried out as in Example 1, with the exception that the specifically described modalities have been used.

The spraying is carried out with 10 g of an aqueous solution at 20% by weight of sodium silicate having an $Si_2O/Na_2O$ molar ratio of 2, corresponding to the addition of 1.0% by weight of sodium silicate as referred to perborate tetrahydrate.

The analytical data measured on the obtained perborate monohydrate are the following:
  titer in active oxygen: 15.05% bulk density: 0.553 g/cc
brittleness: 61.2%
solution rate: lower than 1 minute
stability in solution: 69.6%

EXAMPLE 7

The test is carried out as in Example 1, with the exception that the specifically described modalities have been used.

The spraying is carried out with 9.5 g of an aqueous solution at 21.1% by weight of sodium silicate having an $Si_2O/Na_2O$ molar ratio of 0.49, corresponding to an addition of 1.0% by weight of sodium silicate as referred to perborate tetrahydrate.

The characteristics measured on the obtained perborate monohydrate are the following:
  titer in active oxygen: 15.14%
  bulk density: 0.564 g/cc
  brittleness: 45.5%
  solution rate: lower than 1 minute
  stability in solution: 77.5%

EXAMPLE 8

The test is carried out as in Example 1, with the exception that the specifically described modalities have been used.

The spraying is carried out with 4.4 g of an aqueous solution at 45.81% by weight of sodium silicate having an $Si_2O/Na_2O$ molar ratio of 1.64, corresponding to an addition of 1.0% by weight of sodium silicate as referred to perborate tetrahydrate.

The characteristics measured on the perborate monohydrate obtained are the following:
  titer in active oxygen: 15.06%
  bulk density: 0.556 g/cc
  brittleness: 60.2%
  solution rate: lower than 1 minute
  stability in solution: 66.3%

EXAMPLE 9

The test is carried out as in Example 1, with the exception that the specifically described modalities have been used.

The spraying is carried out with 4.15 g of a solution at 47.45% by weight of sodium silicate having an $Si_2O/Na_2O$ molar ratio of 1.35, corresponding to an addition of 1.0% by weight of sodium silicate as referred to perborate tetrahydrate.

The characteristics measured on the obtained perborate monohydrate are the following:
  titer in active oxygen: 15.06%
  bulk density: 0.554 g/cc
  brittleness: 54.6%
  solution rate: lower than 1 minute
  stability in solution: 63.1%

EXAMPLE 10

The test is carried out as in Example 1, with the exception that the specifically described modalities have been used.

The spraying is carried out with 4.0 g of a solution at 48.70% by weight of sodium silicate having an $Si_2O/Na_2O$ molar ratio of 1.10, corresponding to an addition of 1.0% by weight of sodium silicate as referred to perborate tetrahydrate.

The characteristics measured on the obtained perborate monohydrate are the following:
  titer in active oxygen: 15.06%
  bulk density: 0.564 g/cc
  brittleness: 39.9%
  solution rate: lower than 1 minute
  stability in solution: 63.9%

EXAMPLE 11

A sample of 208 g of damp sodium perborate tetrahydrate having a content of water of 3.8% is mixed, at room temperature, with 2 g of anhydrous sodium silicate in powdery state having an $SiO_2/NaO_2$ molar ratio equal to 1, in a stainless-steel rotary drum of 1 liter of capacity.

The addition is such as to correspond to 1.0% as referred to dry perborate tetrahydrate. The mass is then kept in movement for one further hour to guarantee a complete homogenizing.

The drying step to monohydrate is carried out according to the method described in Example 1.

The characteristics measured on the obtained perborate monohydrate are the following:
  titer in active: 15.01%
  bulk density: 0.549 g/cc
  brittleness: 49.0%
  solution rate: lower than 1 minute
  stability in solution: 70.2%

EXAMPLE 12

The test is carried out as in Example 11, with the exception that the specifically described modalities have been used.

The mixing is carried out with 2 g of anhydrous sodium silicate in powdery state having an $Si_2O/Na_2O$ molar ratio equal to 1.3, corresponding to the addition of 1.0% by weight of sodium silicate as referred to dry perborate tetrahydrate.

The characteristics measured on the obtained perborate monohydrate are the following:
  titer in active oxygen: 15.03%
  bulk density: 0.554 g/cc
  brittleness: 53.5%
  solution rate: lower than 1 minute
  stability in solution: 68.7%

We claim:

1. A process for the manufacture of granular sodium perborate monohydrate, comprising the formation of a mixed composition consisting of sodium perborate tetrahydrate and sodium silicate, by adding sodium silicate, having an $SiO_2/Na_2O$ molar ratio between 0.4 and 2.0, to sodium perborate tetrahydrate in motion and drying said mixed composition until sodium perborate monohydrate is obtained.

2. The process according to claim 1, wherein the sodium silicate is added as an aqueous solution.

3. The process according to claim 1, wherein the sodium silicate is added as a solid.

4. The process according to claim 2, wherein said aqueous solution has between 5 and 50% by weight of sodium silicate.

5. The process according to claim 3, wherein solid sodium silicate is added to damp granular sodium perborate tetrahydrate.

6. The process according to claim 5, wherein the sodium silicate is employed in an amount of between 0.25 to 2.5% by weight of sodium perborate tetrahydrate.

7. The process according to claim 5, wherein the sodium silicate is employed in an amount of 0.5 to 1.5% by weight of sodium perborate tetrahydrate.

8. The process according to claim 4 or 5, wherein the sodium silicate has a molar ratio of $SiO_2/Na_2O$ of from 0.5 to 1.5.

9. The process according to claim 8, wherein the sodium silicate has a molar ratio of $SiO_2/Na_2O$ of 1.

* * * * *